Dec. 19, 1950 E. E. SHRADER 2,534,685
CORN SNAPPING ROLLS
Filed Dec. 5, 1949 3 Sheets-Sheet 1
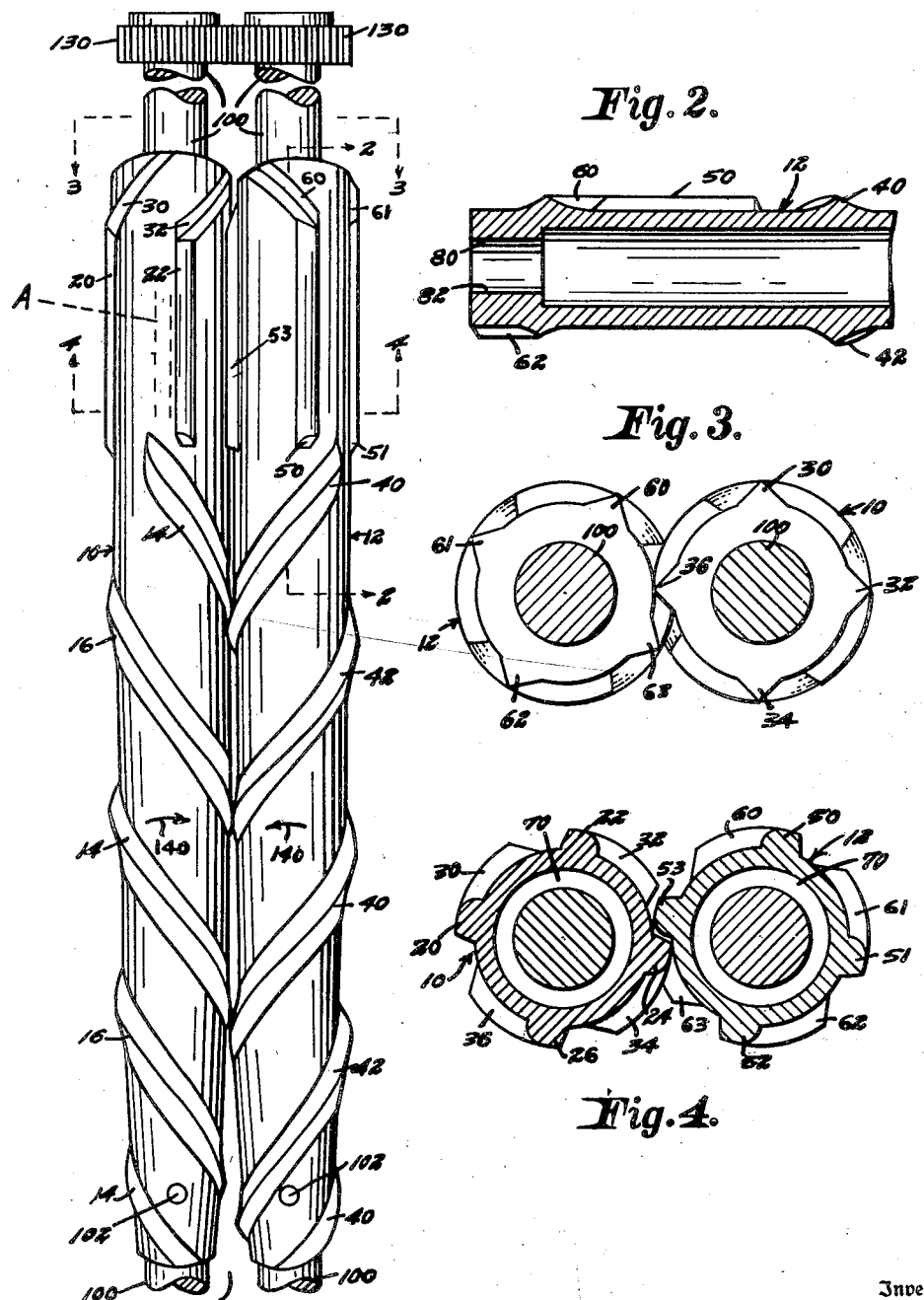
Inventor
Everett E. Shrader
Arthur H. Sturges
By
Attorney Dec. 19, 1950 — E. E. SHRADER — 2,534,685
CORN SNAPPING ROLLS
Filed Dec. 5, 1949 — 3 Sheets-Sheet 2

Inventor
Everett E. Shrader
Arthur H. Sturges
By
Attorney

Inventor
Everett E. Shrader
Arthur H. Sturges
Attorney

Patented Dec. 19, 1950

2,534,685

UNITED STATES PATENT OFFICE 2,534,685

CORN SNAPPING ROLLS

Everett E. Shrader, Ravenna, Nebr., assignor of one-half to Arthur H. Sturges, Omaha, Nebr.

Application December 5, 1949, Serial No. 131,135

2 Claims. (Cl. 130—5)

This invention relates to husking rolls and more particularly relates to a husking roll construction for corn pickers.

An object of this invention is to provide improvements on the corn picking roll construction described in co-pending application Number 785,123, entitled, "Corn Harvesting Mechanism," invented by Everett E. Shrader, filed November 10, 1947, now Patent Number 2,490,715, dated December 6, 1949.

To review the corn picking art as it was prior to the teachings of Patent Number 2,490,715, the conventional corn pickers had utilized a pair of rolls driven in opposite directions for snapping ears of corn from the stalks thereof and a separate set or sets of rolls which are used for removing the husks from the ears; and the present invention aims to provide snapping rolls which also are provided with husking portions, whereby but one set or pair of rolls are necessary for consummating both snapping and husking operations.

It is also well-known that for years industry has been trying to develop a mechanical corn harvester which will pick green corn, or sweet corn, with results substantially better than hand picking. The reason why green corn has not been successfully mechanically harvested to date is that, among other reasons, the corn harvesters of the prior art crush and bruise the ears, whereby the marketability of the sweet corn is destroyed. Also certain prior sweet corn pickers chop the ears of sweet corn in two.

Objects of the co-pending Patent Number 2,490,715 are to provide harvesting rolls eliminating these undesirable features of the prior art.

A particular object of this invention is to provide the lugs of a roll such as that described in co-pending Patent Number 2,490,715, with inclinedly disposed portions for preventing the stalks from moving farther upwardly of the roll and to move the remaining portions of the stalks downwardly between the rolls to prevent fouling of the lugs.

A further object of the invention is to provide an improvement in the shape of the helical ridge of the prior co-pending Patent Number 2,490,715.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a top plan view of a pair of rollers constructed in accordance with this invention, shown as attached to their shafts, certain portions of their shafts being broken away.

Figure 2 is a view-in-section taken along the line 2—2 of Figure 1.

Figure 3 is a view-in-section taken along the line 3—3 of Figure 1.

Figure 4 is a view-in-section taken along the line 4—4 of Figure 1.

Figure 6:
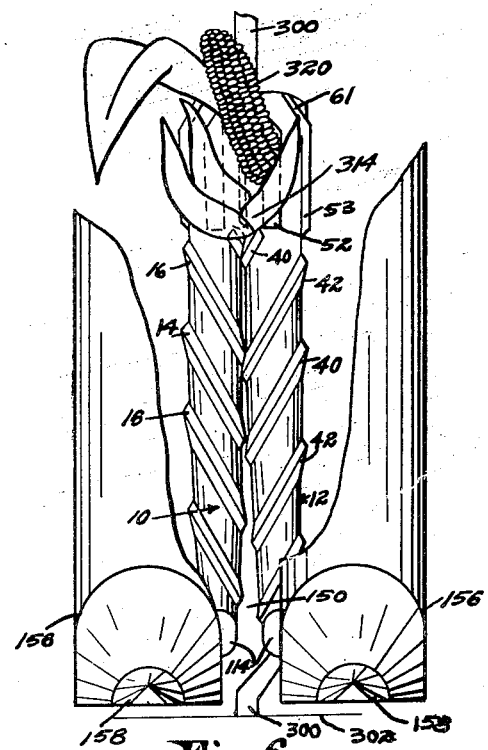
Figure 6 is a view similar to Figure 5, but showing the corn stalk in a later position between the lugs and at a time when the husk is being removed from the ear of corn.
Figure 7:
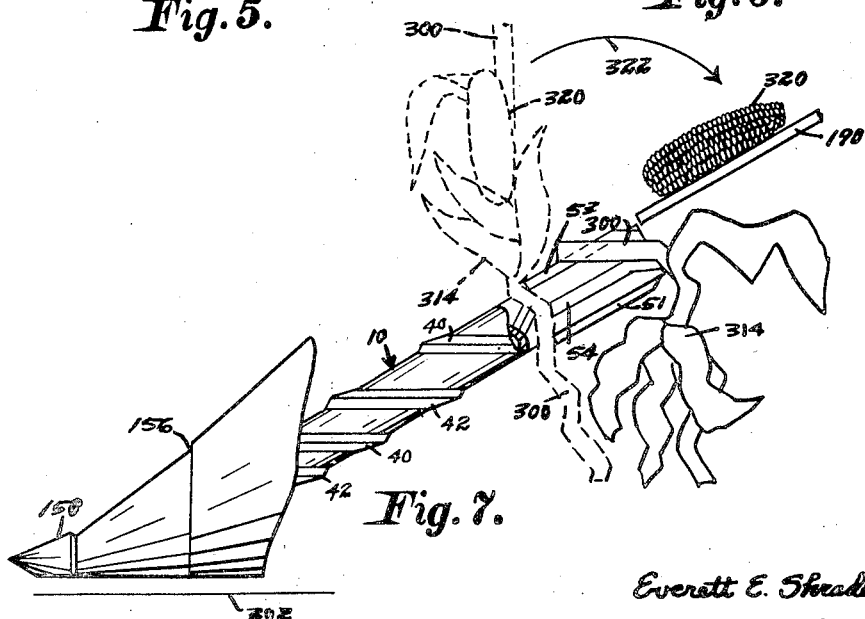

Figure 7 is a view of the picking assembly, with certain portions broken away for purposes of illustration. The position of the stalk which corresponds to the position shown in Figure 6 is illustrated in dotted lines. A subsequent position of the stalk is illustrated in full lines, and the movement of the ear is indicated by an arrow, a later position of the ear being shown in full lines. Forward portions of the gathering fingers of the harvester are shown beneath the ear of corn.

Figure 8:
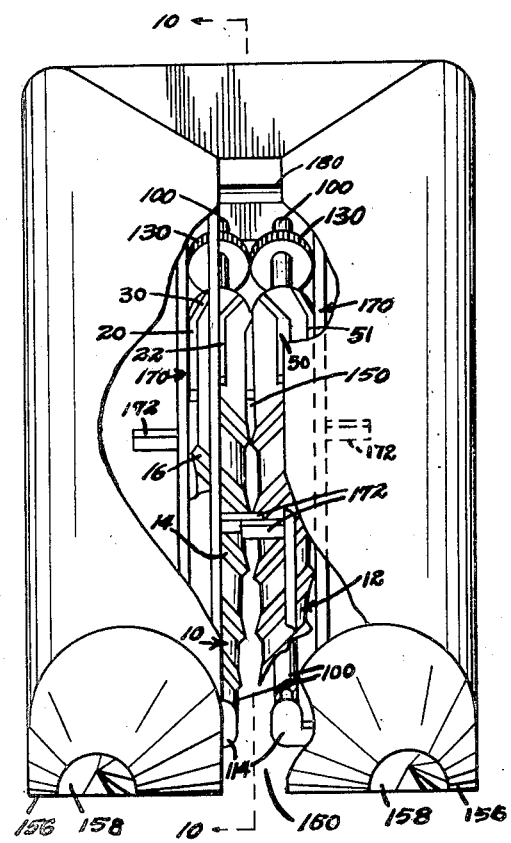

Figure 8 is a frontal elevation of a section of a corn harvester employing the rolls of this invention, a portion of the housing thereof being broken away.

Figure 9:
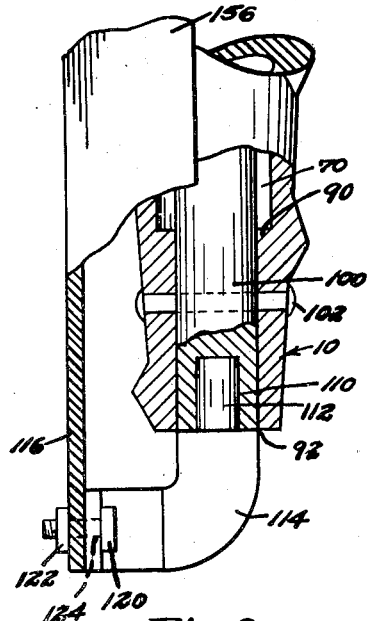

Figure 9 is a detailed view of the lower end of a left hand one of the rolls, shown with its mounting bracket attached to a portion of the frame, portions of the roll, of the roll shaft, and of the housing, being broken away, and other parts showing in section.

Figure 10:
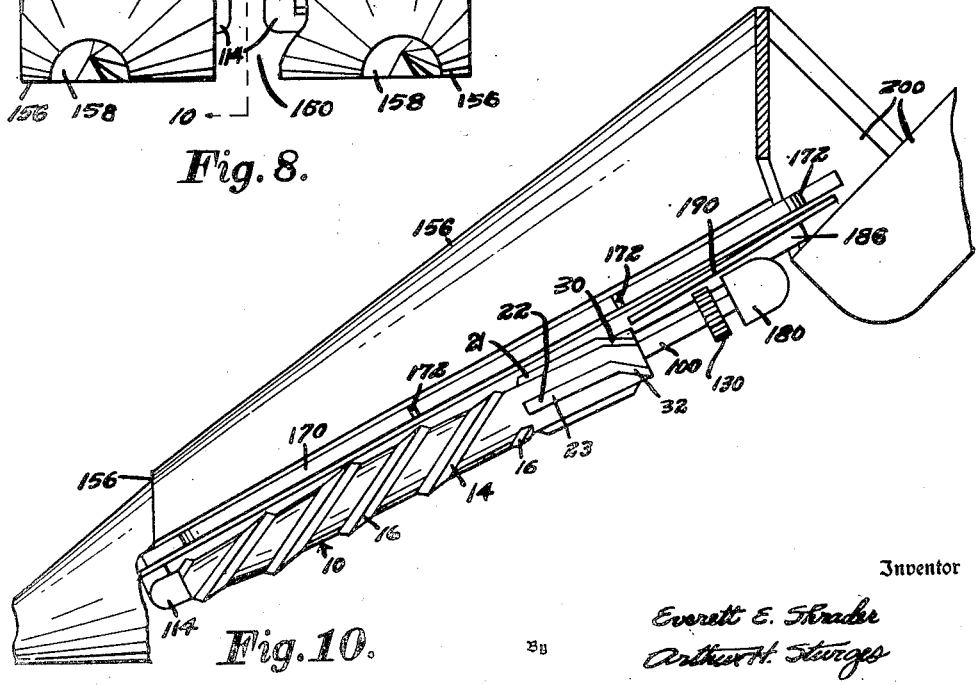

Figure 10 is a side elevation of the left hand roller of the machine, as seen along the line 10—10 of Figure 8.

Referring now to Figure 1, the rollers, or rolls, 10 and 12 of this invention are alike and are circular in cross section, and each tapers slightly from a larger upper and rearward end to a smaller corn-receiving end. The rollers are disposed with their axes in parallelism, approximately horizontal, but inclined downwardly at their forward ends.

The preferred construction is such that the rearward end of each roller is of uniform diameter rearwardly of a point approximately four times the largest diameter of the roller from the forward end thereof. From that point, each roller tapers gradually to its smaller forward end.

The roller 10 is provided with two spaced helical ridges 14 and 16. The ridges are oppositely disposed on the perimeter of the lower end of the roller 10 and wind counter-clockwise upwardly on the outer surface of that roller.

Four equidistantly spaced apart lugs 20, 22, 24 and 26 are provided in parallelism at the upper end of each roller. The lugs are arranged in pairs and are substantially rectangular in top plan. The lugs are preferably disposed rearwardly on a roller from a point spaced three times the largest diameter of a roller from the rearward end thereof. The leading edge of the main body portion of each lug is rounded to prevent injury to ears of corn. As best shown in Figure 4, the said lugs have a leading side surface which is of arcuate contour, as seen in cross section. The lugs 20, 22, 24, and 26 are provided with offsets or spiral ribs 30, 32, 34, and 36, respectively, which are of triangular shape in cross section and are each disposed with one side of its triangle against the roller. The spiral ribs extend from their lugs in a clockwise direction and terminate at the upper end of said roller.

The roller 12 is similarly constructed, having a double ridge, 40 and 42, winding helically thereabout in a clockwise direction, as seen from the forward end thereof. The ridges 40 and 42 are spaced apart similarly to the spacing of the ridges 14 and 16. It will be seen that convolutions of the ridges 14, 16, 40, and 42 are further spaced apart at the rearward end of the roller than at the forward end.

The ridges of each roller are each of triangular shape in cross-section, a base of the triangle being disposed against the respective roller.

The roller 12 is provided with four equidistantly spaced lugs 50, 51, 52, and 53, provided respectively, each with an offset 60, 61, 62 and 63. The offsets 60, 61, 62, and 63 extend away from their respective lugs in counter-clockwise directions and are inclinedly disposed with respect thereto.

It will be seen that the lugs of each roller are provided with their inwardly disposed main body portions in parallelism with the axis of the respective roller. The lugs of each roller are disposed transversely with respect to adjacent convolutions of the ridges of the respective roller, and the lugs of each roller extend substantially longitudinally of the axis of the roller.

The lug 60 of each roller is inclined at substantially a right angle with respect to the inclination of the closest convolution of the closest ridge to each said lug. The lugs of the roller 12 are rounded on their leading sides and their offset portions are triangular similarly to those of roller 10.

The rollers 10 and 12 are formed with hollow centers, indicated in Figure 4 at 70. At both ends of each roller, a shoulder 80 is provided on the inner side of the upper end of the roll having a bore 82 therethrough of a lesser diameter than the hollow interior 70. The lower end of each roll is provided with a similar shoulder 90, as best seen in Figure 9, having a bore 92 therethrough of similar size to the bore 82, each roll being provided with a roll shaft 100, which is adapted to snugly fit the bores 82 and 92.

Adjacent the lower end of each roll, a pin 102 is disposed through the roll and through the shaft.

As shown in Figure 1 the pins 102 are disposed in parallelism and it will be seen that the teeth of the pinions 130 on the shafts 100 are in engagement with each other for causing the rollers 10 and 12 to be rotatably locked together.

In mounting the said rollers upon their respective shafts 100, it is essential that their respective pins 102 be accurately in parallelism at the time the said pins are in the position shown in Figure 1. It will be seen that at the time said rollers are each turned 90 degrees with respect to the showing thereof, as in Figure 1, that the said pins at 102 will, at such time, be disposed in alignment with respect to each other and this is essential so that the rotary movements of the said rollers are synchronized with respect to each other whereby at the time the lug 22 of the roller 10 is moved 90 degrees with respect to the showing thereof, in Figure 1, the lug 50 of the roller 12 will then be disposed so that the lug 50 then slightly over-lies the lug 22 since the lugs cooperate together for removing an ear of corn from the stalk in conjunction with the terminal ends of the helical threads of their respective rollers. The approximate position of the lug 50 and with respect to the lug 22 at the said time is represented by the two dotted lines A, said dotted lines appearing super-imposed upon the full line drawing of the roller 10.

Also a careful boring of the holes for receiving the pins 102 is essential, since other portions of the roller 10 are thereby cooperatively synchronized with respect to the similar parts of the roller 12, including the helically disposed threads of the respective rollers and the offset portions or inclined portions of the lugs of the respective rollers.

Rollers of the instant invention are adapted to be mounted upon several different types of corn picking mechanism now in use by farmers and it has been found in actual practice the said rollers facilitate corn harvesting operations, as well as consummating a saving in the cost thereof and since it is essential that the rotary movement of one roll be timed with respect to the rotary movement of the oppositely disposed roll and in order that the said rolls be truely secured to their respective shafts, it is recommended that the hole for the pin 102 for the roll 12 be bored first through the shaft 100 and then the wall of the hole for said pin disposed horizontal, whereupon a long temporary gauge pin is passed through said bore. The gauge pin, being provided with an accurately disposed sharp center, the pin is then struck a blow with a hammer for marking the shaft 100 of the roll 10, whereby the bores for the pins 102 become truely aligned, whereupon the said gauge pin is removed and the permanent pins 102 provided as shown. However, at the time the rolls are disposed on their respective shafts 100, side by side, and turned to their correct position with respect to each other, it has been found in actual practice, it is well to then place a clamp about the said rolls for locking them, together with their shafts, in the accurate pre-selected desired position and prior to boring the holes for the pins 102 so that the said pins, when finally peened and finished are susceptible of being turned into true alignment with respect to each other by the pinions 130 and for the said cooperative purposes.

Each shaft is provided with a cylindrical recess 110 in its lower end for receiving the cylindrical axle protrusion 112 of a bracket 114, which latter is secured to a frame member 116 by means of a bolt 120 and nut 122, the bolt being disposed through an aperture 124.

The shafts 100 are provided with gear wheels 130 on their upper ends, the teeth of which are disposed in engagement or mesh with each other, and one of which is driven by means not shown, whereby the rolls are synchronized to rotate in opposite directions toward each other on their upper sides by means of the pins or keeps 102. The direction of rotation of the rolls is indicated by the arrows 140 in Figure 1.

The rolls 10 and 12 are disposed one on each side of an opening 150 between two gathering heads 156 of a harvester. The heads 156 are provided with pointed end caps 158 at their forwardmost ends and extend rearwardly about the sides of the elongated opening 150.

On each side of the opening 150 is disposed one of a pair of endless conveyors 170, having fingers 172, which latter pass upwardly adjacent the opening 150 across the said opening at the tip of the latter, then are moved downwardly and forwardly inside the gathering head housings 156 in a continuous cycle. The fingers 172 move in the said manner in order to push corn stalks rearwardly. As best seen in Figure 10, the rolls incline upwardly at their rearward ends and are adapted to rotate in bearings 180 in a fixed orbit. The bearings are secured to the frame in a suitable manner.

Mounted on a frame member 186 above the gears 130 and beneath the conveyor fingers 172, are plates 190 (shown in Figures 7 and 10) upon which an ear of corn, such as the ear 320, slides during operation. Other parts of the frame of the harvester are indicated at 200 in Figure 10.

Figure 5:
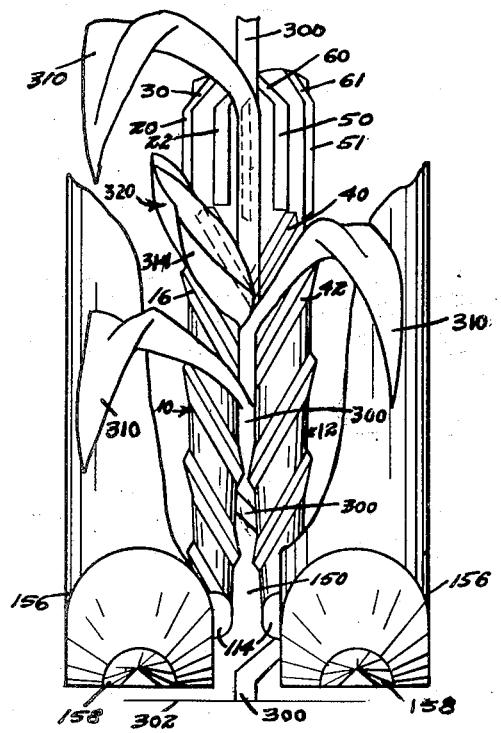
Figure 5 shows a forward portion of a corn-picking unit employing the new rolls. The corn stalk in Figure 5 is shown between the helical ridge in a preliminary phase of the picking operation.

In operation, and referring to Figure 5, as the lower end of a stalk 300, growing upwardly from the surface of the ground 302, is passed by the harvester, the stalk becomes caught between the rolls 10 and 12, and is moved downwardly by the action of the ridges as the machine moves forwardly. The conveyor fingers 172 cause thin stalks to move rearwardly and to push ears of corn upwardly and rearwardly at the time the ears are freed from their husks as later described.

The stalk 300 is naturally provided with leaves or foliage 310, together with one or more ears generally indicated at 320 having husk 314. The stalk 300 reaching the ends of the ridges is delivered to the lugs as seen in full lines in Figure 6 and in dotted lines in Figure 7. The action of the rollers in moving the stalk 300 downwardly aids in causing the butt end of the ear 320 to strike the rollers in a manner whereby the ear is moved from its normal and natural inclined position with respect to the stalk to a nearly vertical position, whereby the butt end of the ear contacts with the rollers in a manner to operate upon the butt end and to the exclusion of the husks or foliage which surrounds the ear. The lugs, in cooperation with the adjacent ends of the ridges, squeeze the lower end of the ear causing the foliage of the husk 314 to spread apart into a rosette or pompon form in plan, and causing the ear 320 to be squeezed and to pop outwardly and upwardly from its husk thereby husking the ear. The husked ear 320 is thereby thrown in conjunction with the oncoming subsequent stalks in the direction of the arrow 322 and lands upon the gathering plate 190. The lugs then continue to force the stalk 300 together with the husk 314 of the ear 320 downwardly, said husk remaining attached to the stalk. If any portion of the stalk is not ejected from the under side of the rolls at the time the stalk reaches the offset portions of the lugs then the offset portion not only arrests the rearward motion of the stalk, but causes the stalk to move or incline forwardly slightly for further operation thereon by the main body portions of the lugs, whereby the stalk is prevented from clogging the mechanism, being ejected downwardly, as shown in full lines in Figure 7.

It has been found in actual practice that in heavy corn, the stalks of which are eight and ten feet high, said corn running one hundred and more bushels to an acre, that the inclined offset portions of the lugs are of particular advantage in a rapid economical harvesting of such corn. For use in lighter corn or very light corn the said lugs may often be dispensed with.

The offset portions of the lugs function as barriers to prevent the stalks from moving rearwardly beyond the rolls, whereby all ears, deformed ears, or "nubbins," are removed from the stalks and harvested.

When picking is completed, the stalks are left standing up as in hand picking and are not unduly mangled, functioning to trap snow on a corn field during winter for moistening the soil for use during the ensuing corn planting and growing season.

From the foregoing description, it is thought to be obvious that husking rollers constructed in accordance with my invention are particularly well adapted for use, by reason of the convenience and facility with which they may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a pair of snapping rolls for a corn picker, the combination which comprises, juxta-positioned similar cylindrical members providing the rolls, the diameters of the leading ends of which are less than the diameters of the trailing ends, the peripheral surfaces of each of said rolls being provided with a plurality of circumferentially spaced coacting helical ridges, said ridges extended from the leading ends of the rolls to points spaced beyond the midway sections thereof, a plurality of spaced parallel longitudinally disposed elongated lugs extended from the ends of said ridges, and spirally disposed ribs extended between the ends of the said lugs and the trailing ends of the rolls, said ribs extended in a direction opposite to that of the said helical ridges.

2. In a pair of snapping rolls for a corn picker, the combination which comprises, juxta-positioned similar cylindrical members providing the rolls, the diameters of the leading ends of which are less than the diameters of the trailing ends, the peripheral surfaces of each of said rolls being provided with a plurality of circumferentially spaced coacting helical ridges, said ridges extended from the leading ends of the rolls to points spaced beyond the midway sections thereof, a plurality of spaced parallel longitudinally disposed elongated lugs extended from the ends of said ridges, with the ends of the ridges terminating at points between the lugs, and spirally disposed ribs extended between the ends of the said lugs and the trailing ends of the rolls, said ribs extended in a direction opposite to that of the said helical ridges.

EVERETT E. SHRADER.

REFERENCES CITED

The following references are of record in the file of this patent:

UNITED STATES PATENTS

| Number | Name | Date |
|---|---|---|
| 786,239 | Stone | Mar. 28, 1905 |
| 839,472 | Goodhue | Dec. 26, 1906 |
| 914,465 | Stone | Mar. 9, 1909 |
| 1,827,216 | Synck | Oct. 31, 1931 |
| 2,178,013 | Blank | Oct. 31, 1939 |
| 2,484,802 | Aasland | Oct. 18, 1949 |